(12) United States Patent
Hinde

(10) Patent No.: US 9,821,656 B2
(45) Date of Patent: Nov. 21, 2017

(54) BLOWER DRIVE SYSTEM FOR A VACUUM TRUCK

(71) Applicant: Trinity Group LTD., King City (CA)

(72) Inventor: Jason Douglas Hinde, King City (CA)

(73) Assignee: TRINITY GROUP LTD., King City, Ontario (CA)

( * ) Notice: Subject to any disclaimer, the term of this patent is extended or adjusted under 35 U.S.C. 154(b) by 88 days.

(21) Appl. No.: 15/150,455

(22) Filed: May 10, 2016

(65) Prior Publication Data

US 2016/0339825 A1   Nov. 24, 2016

(30) Foreign Application Priority Data

May 19, 2015   (CA) ...................................... 2891727

(51) Int. Cl.
| | |
|---|---|
| *B60K 17/28* | (2006.01) |
| *B60K 25/02* | (2006.01) |
| *F04C 18/12* | (2006.01) |
| *F04C 29/00* | (2006.01) |
| *B60P 3/22* | (2006.01) |

(52) U.S. Cl.
CPC .............. *B60K 25/02* (2013.01); *B60P 3/225* (2013.01); *F04C 18/126* (2013.01); *F04C 29/0071* (2013.01); *F04C 29/0085* (2013.01); *B60K 2025/022* (2013.01); *B60Y 2200/14* (2013.01)

(58) Field of Classification Search
CPC ................ F04C 18/126; F04C 29/0085; F04C 29/0071; B60P 3/225; B60K 25/02; B60K 2025/022; B60Y 2200/14

USPC ............................ 180/53.1, 53.4, 53.6, 53.61
See application file for complete search history.

(56) References Cited

U.S. PATENT DOCUMENTS

| | | | |
|---|---|---|---|
| 1,314,677 A | 9/1919 | Linton | |
| 1,670,133 A | 5/1928 | Bemert | |
| 2,184,384 A | 12/1939 | Gregoric | |
| 3,902,219 A | 9/1975 | Jones | |
| 4,904,126 A | 2/1990 | Voith | |
| 4,963,172 A * | 10/1990 | DeMarco | B01D 46/00 141/59 |
| 5,062,868 A | 11/1991 | Kennedy | |
| 5,996,171 A | 12/1999 | Bowers | |
| 7,451,521 B2 * | 11/2008 | Cappellotto | B60P 1/34 15/340.1 |
| 7,798,158 B2 | 9/2010 | Crocker | |
| 8,060,978 B2 | 11/2011 | Young et al. | |
| 9,010,467 B2 * | 4/2015 | Burnier | B60K 25/06 180/53.1 |
| 9,045,072 B2 * | 6/2015 | Hetcher | B60P 1/60 |
| 9,222,448 B2 * | 12/2015 | Ghorpade | F02M 35/164 |

(Continued)

*Primary Examiner* — Toan To
(74) *Attorney, Agent, or Firm* — William J. Clemens; Shumaker, Loop & Kendrick, LLP

(57) ABSTRACT

A blower drive system for a vehicle such as a vacuum truck includes a blower including a blower input shaft and a blower housing; a transfer case operably connected to transfer drive from the vehicle engine driveline to the blower input shaft; a frame bracket assembly including one or more connections to the vehicle chassis frame and one or more connections to the blower housing. The frame bracket assembly mounts the blower housing in a specified fixed angle with respect to ground and mounts the bottom of the blower housing in a specified fixed height above the vehicle chassis frame.

24 Claims, 12 Drawing Sheets

(56) References Cited

U.S. PATENT DOCUMENTS

| | | | |
|---|---|---|---|
| 2003/0116372 A1* | 6/2003 | Keen | B60K 25/02 180/68.3 |
| 2004/0045111 A1* | 3/2004 | Engel | E01H 1/042 15/84 |
| 2005/0209747 A1* | 9/2005 | Yakes | B60K 1/02 701/22 |

* cited by examiner

BLOWER DRIVE SYSTEM FOR A VACUUM TRUCK

CROSS-REFERENCE TO RELATED APPLICATION

This application claims the benefit of priority to Canadian Patent Application No. 2,891,727 filed May 19, 2015 entitled BLOWER DRIVE SYSTEM FOR A VACUUM TRUCK, the contents of which are hereby expressly incorporated by reference in the Detailed Description of Example Embodiments, herein below.

FIELD OF THE INVENTION

At least some example embodiments generally relate to vacuum trucks which can be used for loading, transporting, and off-loading liquid, semi-solid, and/or solid waste materials, and specifically to blower drive systems for such vacuum trucks.

BACKGROUND OF THE INVENTION

Typical trucks with vacuum tanks (hereinafter referred to as "vacuum trucks") often include a storage such as a cylindrical tank of sufficient construction to withstand a typical external pressure of 15 psi and an internal pressure from 15 psi for non-code tanks to 35 psi for U.S. Department of Transport (DOT)/Transport Canada (TC) 407/412 certified pressure vessels. The tanks are attached to a vacuum pump that may consist of a hydraulically driven air or liquid-cooled vane pump or a much larger, more powerful positive displacement blower or liquid ring vacuum pump.

In order to leverage the typically higher horsepower and torque of the truck chassis engine, a transfer case is often used to tap into the main truck chassis engine driveline in order to transfer drive to the blower. For example, in operation, drive is provided to the blower when the vacuum truck is parked and drive is no longer required to the wheel axles. Transfer cases can have complex components and moving parts in order to provide these switch modes of operation. Often, since the blower and the engine are located on the same side of the transfer case, many transfer cases have components which provide U-directional angles to transfer the drive from the engine to the blower.

In some conventional systems, the positive displacement blower is connected to the transfer case, and the blower is also mounted to be nested within the main frame rails of the truck chassis. However, this type of system can be inflexible when trying to incorporate or retrofit within existing systems, and may make activities such as, for example, installation, replacement, removal and/or repair of the blower to be cumbersome and even impractical in many applications.

It may also be cumbersome to provide proper alignment between the blower and the transfer case. Often, the components of the engine and transfer case are not perfectly horizontal with reference to the truck or to the ground. For example, discrepancies in alignment angle between the transfer case and blower could provide additional stress between the intermediary attachment components.

Additional difficulties with existing systems may be appreciated in view of the detailed description of example embodiments, below.

BRIEF SUMMARY OF THE INVENTION

In an example embodiment, there is provided a blower drive system for a vehicle such as a vacuum truck. The blower drive system includes a blower including a blower input shaft and a blower housing; a transfer case operably connected to transfer drive from the vehicle engine driveline to the blower input shaft; a frame bracket assembly including one or more connections to the vehicle chassis frame and one or more connections to the blower housing. The frame bracket assembly mounts the blower housing in a specified fixed angle with respect to ground and mounts the bottom of the blower housing in a specified fixed height above the vehicle chassis frame.

In an example embodiment, there is provided a blower drive system for a vehicle, the vehicle including a vehicle engine, one or more rear wheel axles, and a vehicle chassis frame for mounting the one or more rear wheel axles and which defines a support bed for the vehicle, the blower drive system including: a blower including a blower input shaft and a blower housing having a bottom; a transfer case including a transfer case housing, an input shaft, a first output shaft driveable from the input shaft, and a second output shaft driveable from the input shaft; the input shaft operably connected to receive drive from the vehicle engine; the second output shaft operably connectable to drive the one or more rear wheel axles; the first output shaft operably connected to drive the blower input shaft; and a frame bracket assembly including one or more connections to the vehicle chassis frame and one or more connections to the blower housing, wherein the frame bracket assembly mounts the blower housing in a specified fixed angle with respect to ground and mounts the bottom of the blower housing in a specified fixed height above the vehicle chassis frame.

A blower drive system for a vehicle, the vehicle including a vehicle engine, one or more rear wheel axles, and a vehicle chassis frame for mounting the one or more rear wheel axles and which defines a support bed for the vehicle, the blower drive system including: a blower including a blower input shaft and a blower housing having a bottom; and a frame bracket assembly for connecting the blower housing to the vehicle chassis frame, the frame bracket assembly including a first set of brackets and a second set of brackets, wherein each bracket of the first set of brackets defines throughholes which align together to result in a plurality of specified heights for the bottom of the blower housing above the vehicle chassis frame, including a specified fixed height for the bottom of the blower housing above the vehicle chassis frame, wherein each bracket of the second set of brackets defines throughholes which align together to result in a plurality of specified angles for the blower housing, including a specified fixed angle for the blower housing with respect to ground.

BRIEF DESCRIPTION OF THE DRAWINGS

For a better understanding of present example embodiments, and to show more clearly how it may be carried into effect, reference will now be made, by way of example, to the accompanying drawings which show exemplary embodiments in which.

Similar reference numerals may be used in different figures to denote similar components.

DETAILED DESCRIPTION OF EXAMPLE EMBODIMENTS

Figure 1:
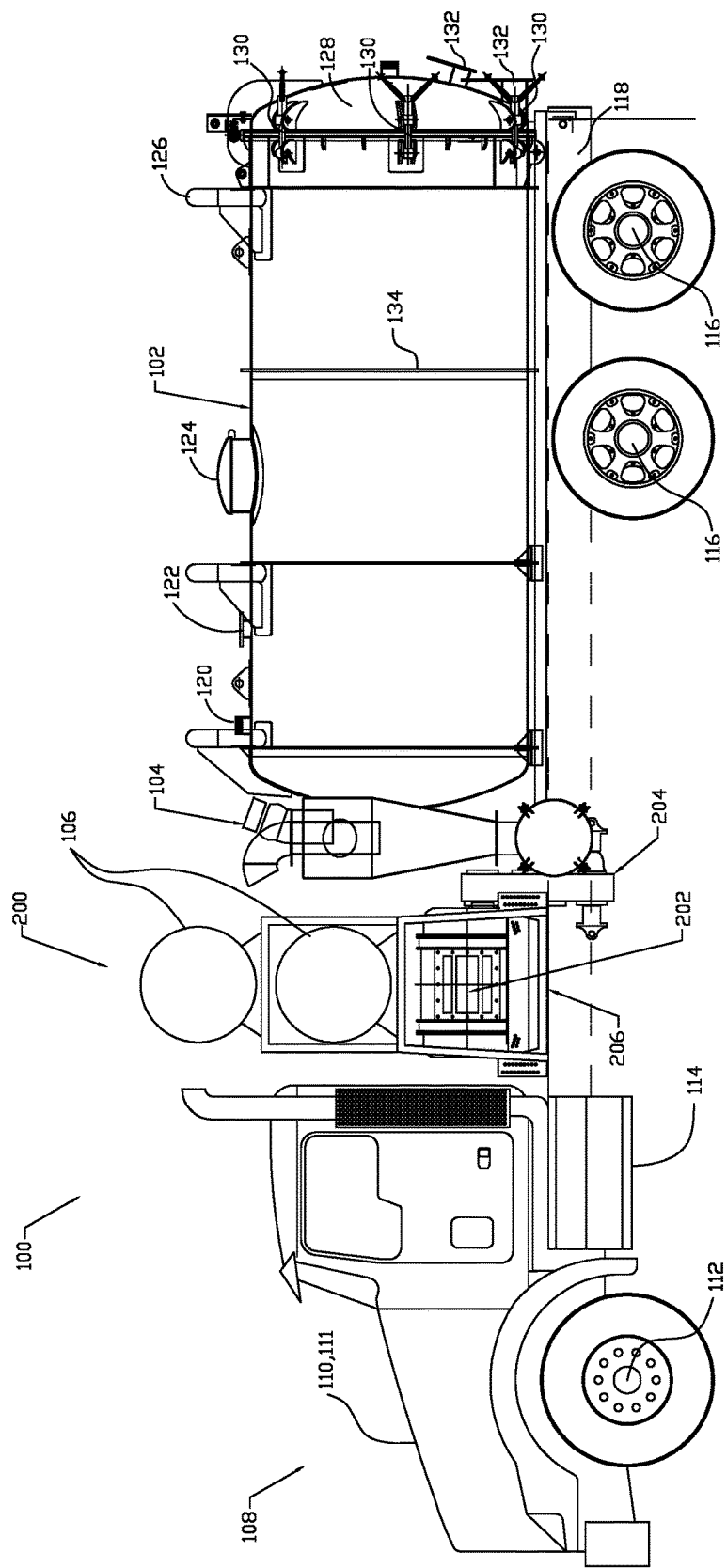
FIG. 1 illustrates a side view of an example embodiment of a vacuum truck, which includes a first example embodiment of a blower drive system.

On truck mounted mobile vacuum equipment, the vacuum pumps are typically powered or driven off of the truck chassis engine or driveline, although there are some unique cases of auxiliary engines being installed to power the vacuum pump as well. Typically, as long as the power requirements do not exceed the torque ratings of the Power Take Off (PTO) openings on the truck chassis transmission, the vacuum pumps are either hydraulically driven or direct/gearbox driven off of a PTO installed directly on to the transmission.

Once the power requirement of the vacuum system exceeds the capabilities of the transmission PTO openings, typically approximately 100 horse power, an alternative method of driving or powering the vacuum pump is needed. Typically this is achieved through the use of a transfer case or split shaft PTO installed in the main driveline of the truck chassis, between the transmission and rear differential(s). This allows for the full rated horsepower and torque of the truck chassis engine to be tapped into to drive the vacuum pumps which can have power requirements exceeding 300 horse power.

For positive displacement blower applications that exceed the capabilities of the transmission PTO openings, the industry has simply utilized existing transfer case configurations that were originally designed and built to power the front axle(s) of a truck chassis, when making a 4 wheel, 6 wheel or even 8 wheel drive chassis, and simply inverted the transfer case, with some internal modifications for oil circulation, and installed them between the frame rails of the truck chassis with the output portion now extending up from the driveline instead of downwards.

When installing a transfer case into an existing driveline, careful consideration must be given to driveshaft lengths and U-joint angles to insure that the torsional and inertial limits for the driveline are not exceeded as well as taking into account the half true critical speed. This restricts how high the transfer case can be installed in the chassis, typically limiting the maximum elevation of the bottom input shaft of the transfer case to, being even or level with the output shaft of the main transmission. On average, the center to center distance of the input shaft to the output shaft on many existing transfer cases is approximately 17 inches. This further restricts the ultimate installed elevation of the blower being driven by the transfer case.

On installations where the blower is mounted directly behind the cab of the truck (this represents approximately 95% of the installations) and the transfer case is installed as close to the blower as possible, there is typically approximately 12 inches of space between the tip of the input shaft on the blower and the tip of the upper output shaft on the transfer case. This typically requires a short coupled driveshaft or intermediary shaft to be installed between the transfer case and blower, to drive it.

The typical installation described above results in the blower mounting feet to be well down below the top of the truck frame rails or frame bed. This requires the vacuum truck manufacturer, performing the installation, to often have to remove truck chassis cross members and relocate truck mounted equipment such as air tanks and air driers etc., which are all competing for this same space. Further, removing all wires, air lines and hoses fastened to the inside of the truck frame to facilitate the installation of steel plates to the inside of the truck frame so that a blower mount can be fabricated and welded to these plates, bolted to the inside of the frame rails. This is a very costly and time consuming process that can also create problems when trying to reconnect all of the relocated equipment.

In an example embodiment, there is provided a blower drive system for a vehicle such as a vacuum truck. The blower drive system includes a blower including a blower input shaft and a blower housing; a transfer case operably connected to transfer drive from the vehicle engine driveline to the blower input shaft; a frame bracket assembly including one or more connections to the vehicle chassis frame and one or more connections to the blower housing. The frame bracket assembly mounts the blower housing in a specified fixed angle with respect to ground and mounts the bottom of the blower housing in a specified fixed height above the vehicle chassis frame.

One example embodiment includes configuring (increasing) the typical center to center distance of the transfer case to create a purpose built drive system to facilitate installing the entire blower and blower mounting assembly above the frame on a specially designed above-frame mounting assembly, eliminating the costly and time consuming process outlined above, thus allowing the installers to simply bolt down the blower and drive assembly on top of the chassis with a specially designed mounting assembly.

An example embodiment includes applying a purpose built, standalone transfer case to the traditional installation method outlined above and mounting this whole combination on to a mounting assembly above the chassis in accordance with example embodiments.

Another example embodiment includes further configuring both the transfer case and blower so that they bolt together with a splined male/female, or similar, connection between the output of the transfer case and input to the blower further simplifying the installation while at the same time reducing the overall length of the installation by approximately 15 inches.

This example embodiment may provide a more compact and simplified installation process than the standalone transfer case model while still maintaining a separate blower and transfer case, potentially preventing contamination from one system from damaging the other reducing repair cost should a major malfunction occur in either the transfer case portion or the blower. This example embodiment may allow for the blower and transfer case to be adjusted for driveline angle and height within the "above chassis" blower mounting assembly, further simplifying the installation process.

Another example embodiment includes incorporating a transfer case drive into the drive end of the blower so that the drive end gear casing of the blower may include both the drive gears to turn both the upper and lower lobes of the blower as well as house the required gear sets, or other similar drive components, to extend down to the main drive line of the chassis and perform the connect and disconnect function of a transfer case to allow the blower to operate while the truck remains stationary.

FIG. 1 illustrates a side view of an example embodiment of a vacuum truck 100, which includes an example embodiment of a blower drive system 200. As shown in FIG. 1, the blower drive system 200 includes a blower 202, a transfer case 204, and a frame bracket assembly 206.

The vacuum truck 100 can include, for example, a vacuum tank 102 for storage of waste contents, a cyclone 104 for separating waste contents, one or more silencers 106, and a truck chassis 108. The truck chassis 108 can include a hood 110 which houses the truck engine 111 therein (details of the truck engine 111 are well understood in the art). A transmission 114 has selectable drive gears contained therein to be driven from the truck engine 111. Front wheel axles 112 can be driven by the transmission 114 and are mounted to the truck chassis 108. One or more rear wheel axles 116 (two shown here) can be free-rotating or can be selectably connected to the transfer case 204 to receive drive transferred from the engine 111 or the transmission 114, described in greater detail herein. A chassis frame 118 mounts the rear wheel axles 116 and also defines a support bed for the truck 100. For example, the chassis frame 118 can include rails and other support members. As shown in FIG. 1, wheels are rotatably mounted to the wheel axles 112, 116.

Still referring to FIG. 1, the vacuum tank 102 can further include, for example, pressure relief port 120, internal shut off 122, manway 124, Department of Transport (DOT)/Transport Canada (TC) 407/412 overturn protection (rollover bars) 126, full opening rear door 128, rear door bolts and wingnuts 130, and rear loading valve nozzles 132. One or more reinforcing rings 134 can be used to increase the structural stability of the tank. Certain components such as trim, side trays, fenders, and piping and hose connections to connect the vacuum tank to the vacuum system, etc., have not been shown to de-clutter the drawings so that other components can be more clearly shown. Also for clarity, as shown in FIG. 1, part of the truck chassis 108 has been hidden (indicated by dotted lines). In some example embodiments, the vacuum truck 100 has the tank 102 supported by the vehicle chassis 108 which is part of the truck 100 itself rather than a separate trailer. In some example embodiments, the vacuum truck 100 can generally be used for various example embodiments of the blower drive system described herein.

Figure 2:
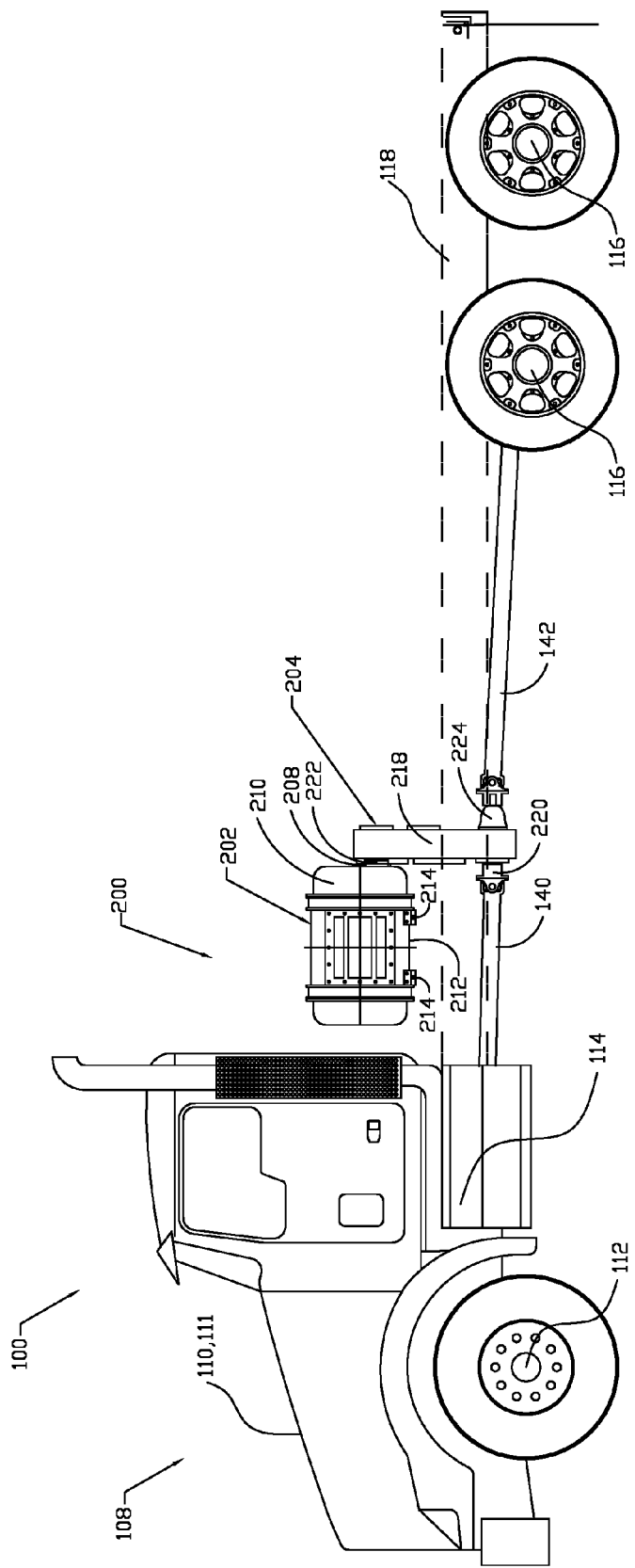
FIG. 2 illustrates a detail side view of the first example embodiment of the blower drive system for the vacuum truck shown in FIG. 1.

FIGS. 2 to 8 illustrate further detail of the blower drive system 200, in accordance with an example embodiment. FIG. 2 illustrates a detail side view of a blower/transfer case combination, where both the blower 202 and the transfer case 204 have been configured to bolt together as an assembly. As shown in FIG. 2, the blower 202 includes a blower input shaft 208 (obscured in FIG. 2, better shown in FIG. 8), a blower housing 210 having a bottom 212 and blower mounting feet 214. The blower input shaft 208 can be used to drive lobes (not shown) or other displacement mechanisms in order to generate positive displacement through the blower housing 210.

For clarity, the frame bracket mounting assembly 206 has not been shown in FIG. 2 to illustrate the location of the blower mounting feet 214 (bottom 212 of the blower housing 210) relative to the chassis frame 118. Also for clarity, the chassis frame 118 has been hidden (indicated by dotted lines), so that there can be seen the blower 202 and the transfer case 204 installation behind them.

In an example embodiment, the transfer case 204 can include a transfer case housing 218, an input shaft 220 located on the front side of the transfer case housing 218, a front output shaft 222 or coupling driveable from the input shaft 220, and a rear output shaft 224 located on the rear side of the transfer case housing 218 and driveable from the input shaft 220. A first main driveline drive shaft 140 connects the input shaft 220 to the transmission 114, so that the input shaft 220 can receive drive directly or indirectly from the vehicle engine 111. The front output shaft 222 of the transfer case 204 is operably connected to drive the blower input shaft 208, thereby driving the blower 202. As shown in FIG. 2, in an example embodiment, the input shaft 220 and rear output shaft 224 can have associated universal joint (u-joint) connectors, to account for slight variations in connection angle, for example up to approximately 3 degrees in angle.

A second main driveline drive shaft 142 is connectible to the rear output shaft 224 to one or more of the rear wheel axles 116. In some example embodiments, the transfer case 204 is able to selectively transfer drive to the output shafts 222, 224. For example, "selective" can include mechanical, manual, automated, or semi-automated mechanisms to switch between the output shafts 222, 224. For example a shifter or gear shifter system (not shown) can be used to select between output shafts 222, 224. For example, "selective" can also include disconnecting the second main driveline drive shaft 142 or the blower input shaft 208. For example, this can include selectively disconnecting the second main driveline drive shaft 142 from the rear output shaft 224, thereby having no load on the rear output shaft 224, and only having load on the front output shaft 222, for example when the vacuum truck is parked. This can include selectively disconnecting the blower input shaft 208 from the front output shaft 222 thereby having no load on the front output shaft 222, and only having load on the rear output shaft 224, for example when driving the vacuum truck 100.

Figure 3:
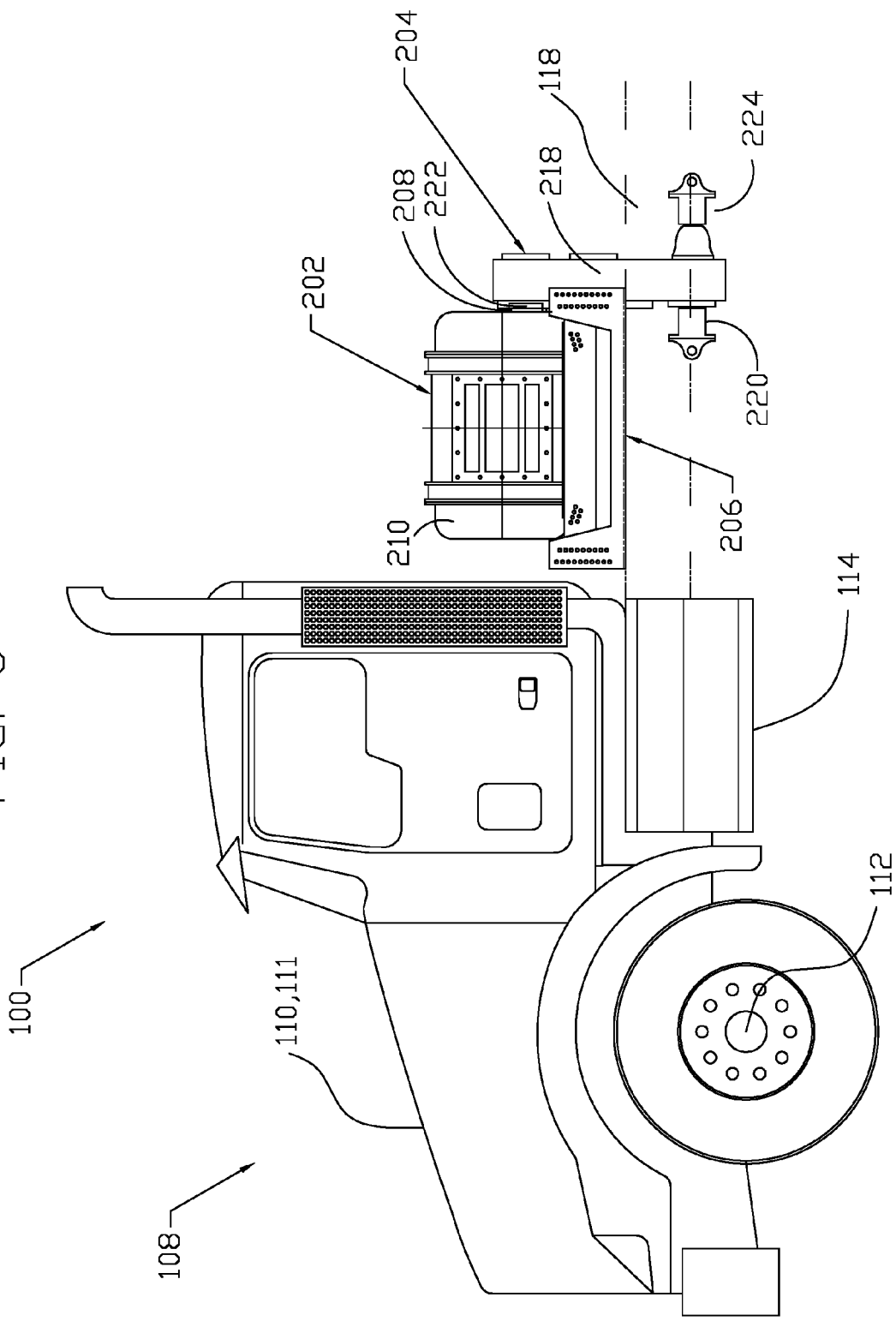
FIG. 3 illustrates a greater detail side view of the example blower drive system shown in FIG. 2.

Referring now to FIGS. 2 and 3, in an example embodiment, the frame bracket assembly 206 can be used as an above-chassis frame mounting assembly. In an example embodiment, the frame bracket assembly 206 includes one or more connections to the vehicle chassis frame 118 and one or more connections to the blower housing 210. During operation of the blower input shaft 208, for example when the vacuum truck 100 is parked, the frame bracket assembly 206 mounts the blower housing 210 in a specified fixed angle with respect to ground (level) and mounts the bottom 212 of the blower housing 210 in a specified fixed height above the vehicle chassis frame 118. Typically, in many vacuum trucks 100 the transfer case 204 is mounted to the vehicle chassis frame 118 at a slight angle. The angle of the blower housing 210 is therefore aligned or matched when connecting with the transfer case 204. The frame bracket assembly 206 can mount the blower in a plurality of possible specified heights, and a plurality of possible specified angles. It is noted that the frame bracket assembly 206 can maintain the specified fixed height and angle of the blower 202 when the blower 202 is in operation.

In many vacuum trucks 100, the main truck engine 111 and the transmission 114 are approximately 3 degrees down or sloped to the rear end of the truck 100. The main driveline drive shaft 140 extends from the transmission 114 at a slight angle, for example usually slightly less angle than the truck engine 111 and the transmission 114. The blower drive system 200 is flexible enough so that all driveline elements are mounted so as to be properly aligned. For example, in an example embodiment, the main engine 111 and transmission 114, the transfer case 204, the shafts 208, 222, and the blower 202 are all mounted at approximately the same slight angle, for example approximately three degrees. This is accomplished by the frame bracket assembly 206 including fastening positions which align between its brackets to result in a plurality of possible specified heights, and a plurality of possible specified angles.

In an example embodiment, the transfer case 204, and specifically the transfer case housing 218, are purpose built or modified with respect to conventional transfer cases. For example, a typical transfer case center-to-center distance between the input shaft 220 and the output shaft 222 can be approximately 17 to 18 inches high. The higher (taller) transfer case housing 218 permits the transfer case 204 to be properly connected and aligned with the blower 202, wherein the blower housing 210 is raised from the vehicle chassis frame 118. In some example embodiments, the center to center distance from the input shaft 220 to the output shaft 222 can be, for example, any height which is at least 24 inches. In an example embodiment, the center to center distance from the input shaft 220 to the output shaft 222 can be approximately 28 inches. These distances can be suitable for most existing vacuum trucks 100 on the market.

Figure 4:
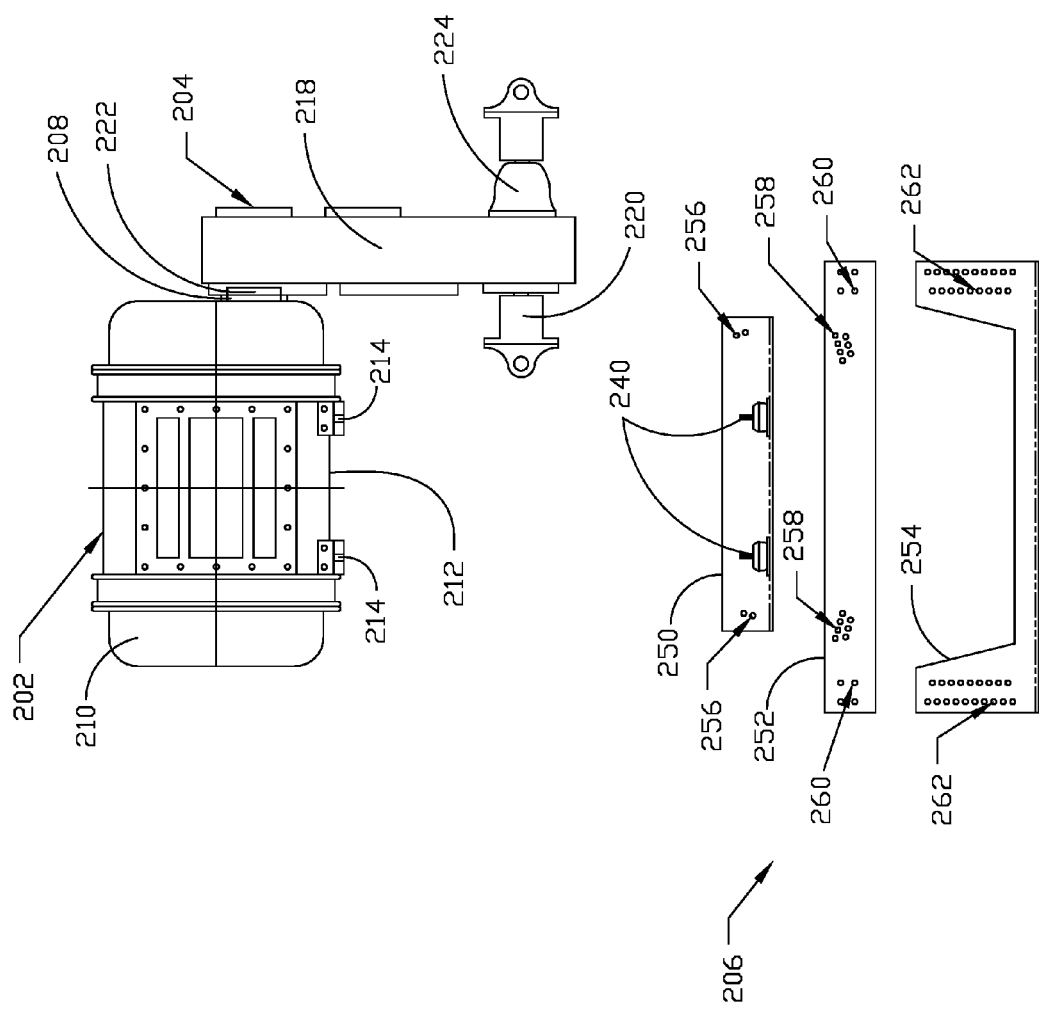
FIG. 4 illustrates an exploded side view of a frame bracket assembly of the first example embodiment of a blower drive system shown in FIG. 3.
Figure 5:
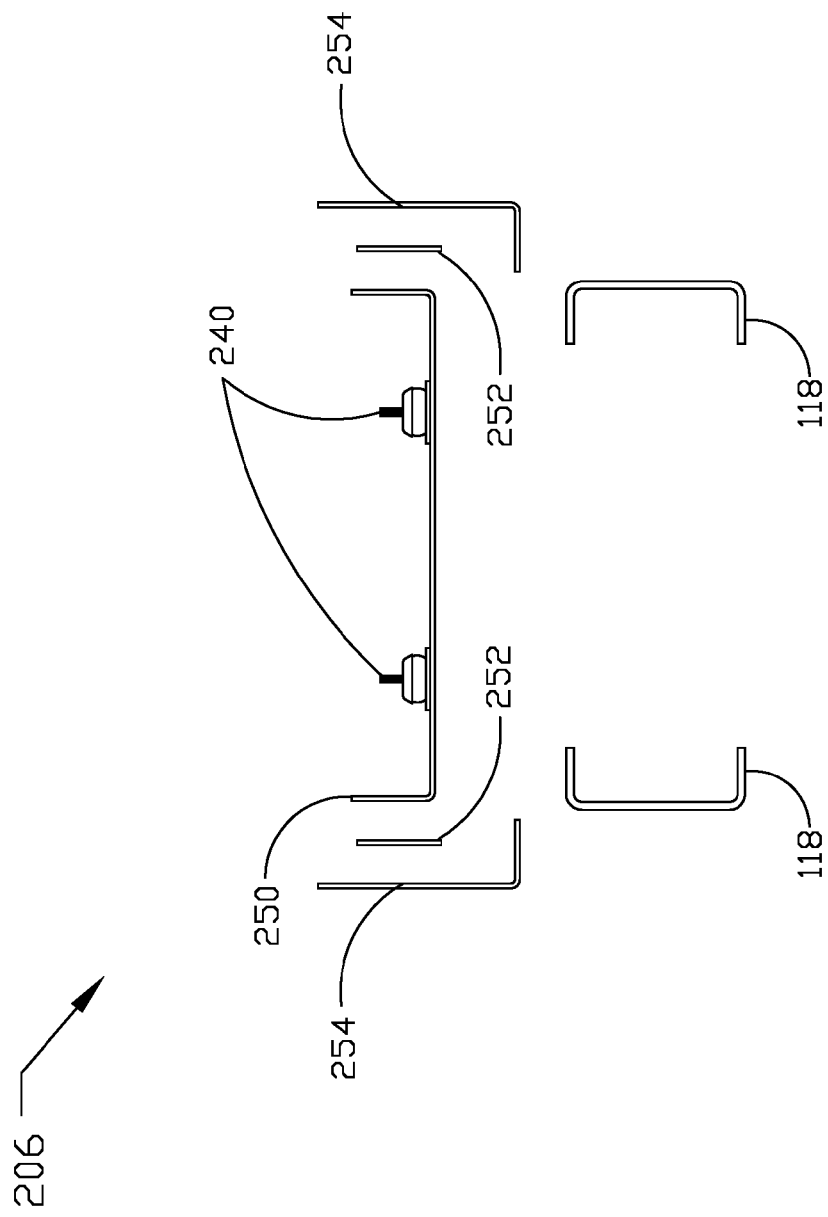
FIG. 5 illustrates an exploded end view of the frame bracket assembly shown in FIG. 4.
Figure 6:
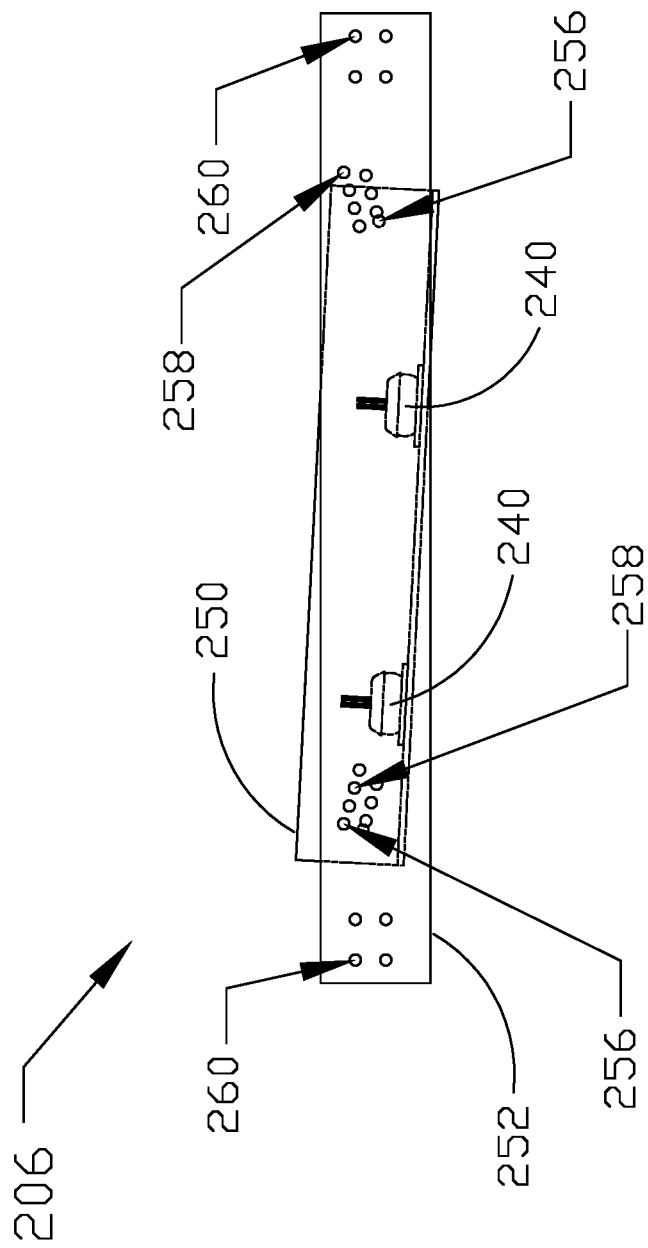
FIG. 6 illustrates a cross-sectional assembled side view of the frame bracket assembly shown in FIG. 4, shown in a bias angled mounted position for mounting the blower on an angle.
Figure 7:
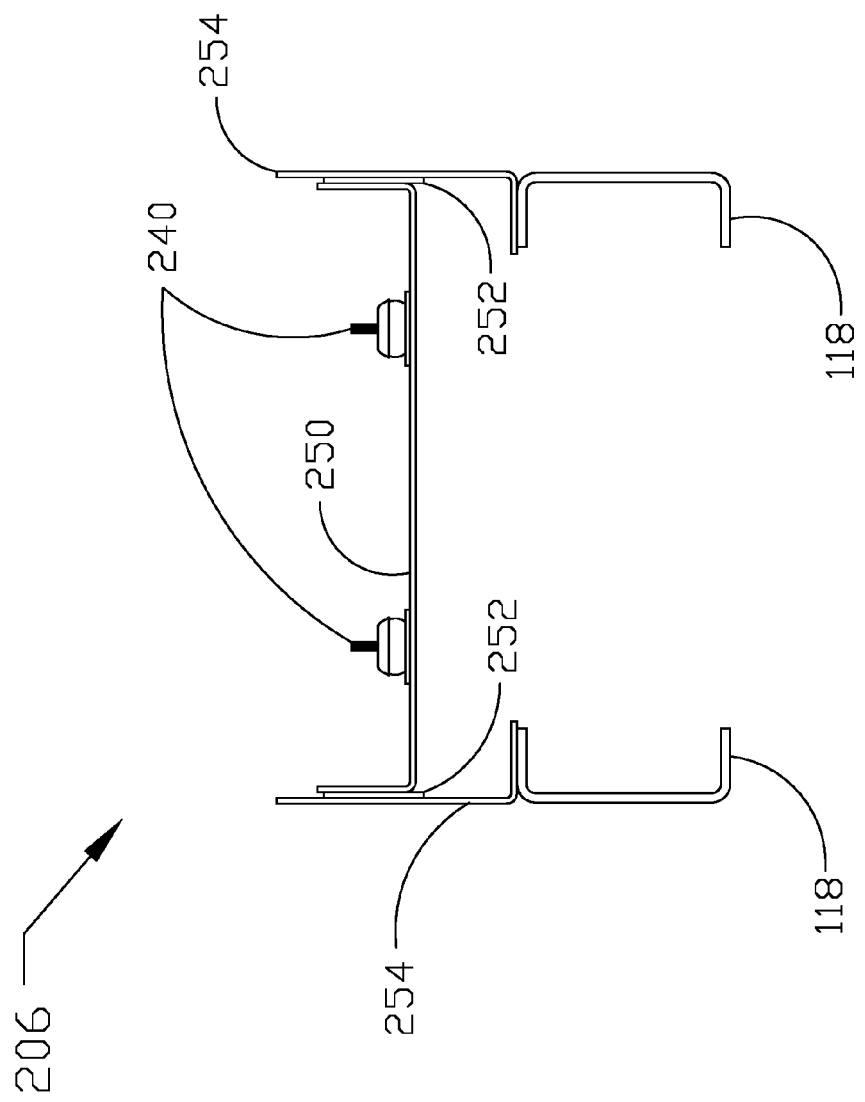
FIG. 7 illustrates an assembled end view of the frame bracket assembly shown in FIG. 4, shown in a level position.

Reference is now made to FIGS. 4 to 7, which illustrate the frame bracket assembly 206 in greater detail. FIGS. 4 and 5 illustrate exploded side and end views of the frame bracket assembly 206, respectively. FIGS. 6 and 7 illustrate a cross-sectional assembled side view and an end view of the frame bracket assembly 206, respectively, wherein FIG. 6 shows a bias angled mounted position for mounting the blower 202 on an angle.

As shown in FIGS. 4 and 5, in an example embodiment, the frame bracket assembly 206 includes a blower mounting bracket 250, an angle adjustment bracket 252, and a height adjustment bracket 254. Referring now to the blower mounting bracket 250, in an example embodiment, vibration dampeners 240 can be mounted therein. The vibration dampeners 240 can define suitable throughholes so as to be bolted to the blower mounting feet 214. In an example embodiment, the blower mounting bracket 250 can also define mounting holes 256 incorporated into the sides of the blower mounting bracket 250. The mounting holes 256 correspond to the angle adjustment bracket 252. The angle adjustment bracket 252 defines multiple holes 258 corresponding to the mounting holes 256 so that the blower mounting bracket 250 can bolt to the angle adjustment bracket 252, which can vary the angle from level to approximately 3 degrees down (or sloped to the rear of the truck) in ½ degree increments, which should be sufficient for driveline calculations. In an example embodiment, the angle adjustment bracket 252 can also further define corresponding mounting holes 260 installed in the outer ends that will match up with the array of adjustment holes 262 defined by the height adjustment bracket 254. The height adjustment bracket 254 can be bolted or otherwise connected to the vehicle chassis frame 118. The height adjustment bracket 254 allows the blower/transfer case assembly, already adjusted for angle, to be raised and lowered relative to the top of the vehicle chassis frame 118 (e.g. frame rails thereof) to achieve optimum driveline angles.

FIG. 6 illustrates the blower mounting bracket 250 installed on a 3 degree angle relative to the angle adjustment bracket 252. FIG. 7 shows an end view of all three components, blower mounting bracket 250, angle adjustment bracket 252 and height adjustment bracket 254 together, on top of the vehicle chassis frame 118 with the blower mounting bracket 250 in the level position. The blower mounting bracket 250 is raised above the vehicle chassis frame 118 to a specified height. If more angle or smaller variations in angle is required, more adjusting/locating holes can be added to the design, for example. Note that, in FIG. 6, the blower mounting bracket 250 is shown as transparent so that the detail of the connection can be seen.

As can be seen from FIGS. 4 to 7, one set of frame brackets 252, 254 therefore defines throughholes 260, 262 or positions which align together to result in a plurality of specified heights for the bottom 212 of the blower housing 210 above the vehicle chassis frame 118. Another set of brackets 250, 252 defines throughholes 256, 258 or positions which align together to result in a plurality of specified angles for the blower housing 210.

In some example embodiments, bolts are used to connect the brackets together and to the blower housing 210 and the vehicle chassis frame 118. In other example embodiments, other fasteners can be used, such as pins, nails, rivets, etc.

Figure 8:
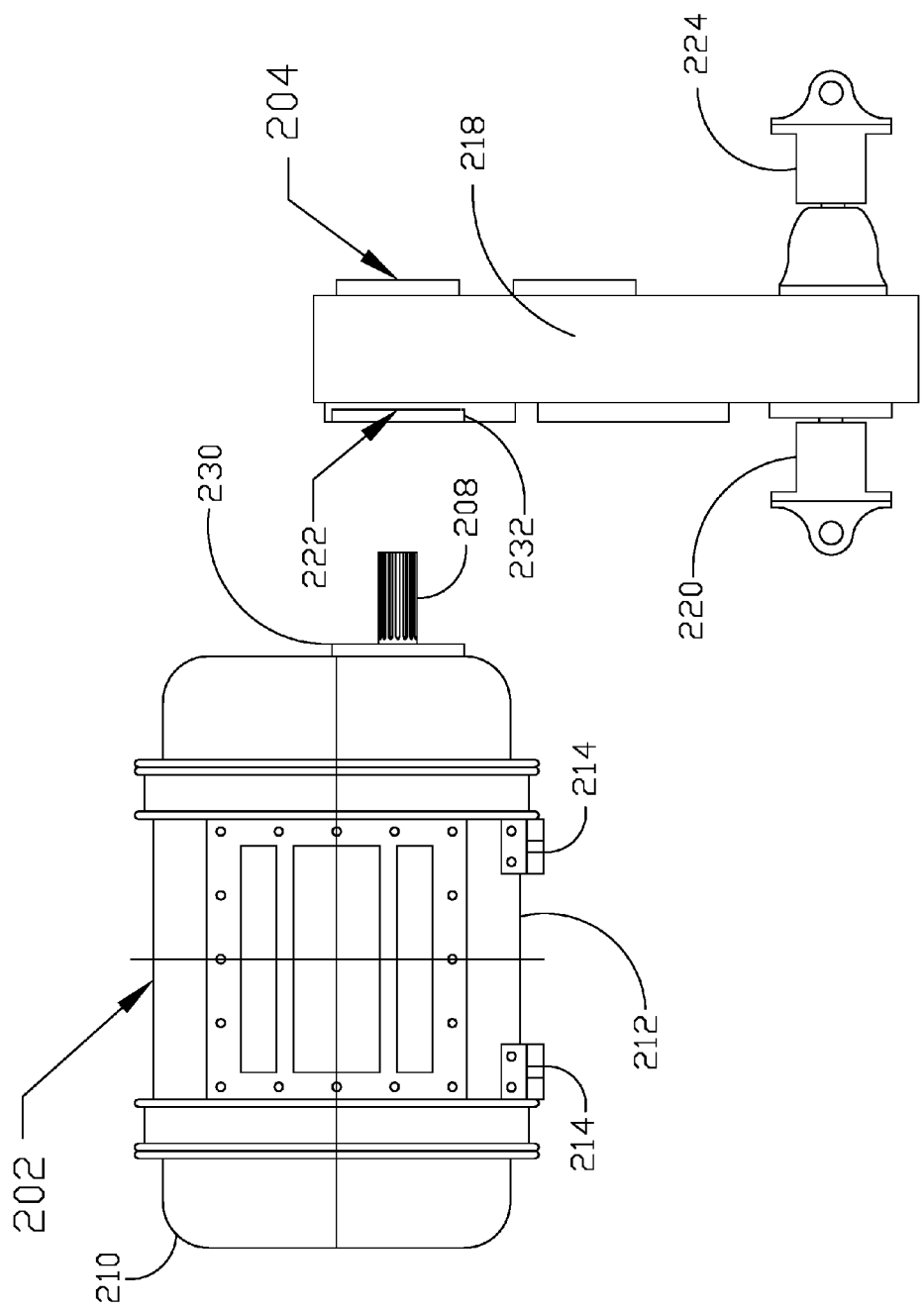
FIG. 8 illustrates an exploded side view of an assembly of the example blower drive system shown in FIG. 2.

FIG. 8 illustrates an exploded side view of an assembly of the example blower drive system shown in FIG. 2, in accordance with an example embodiment. In the example embodiment shown, an intermediary output drive shaft between the blower 202 and the transfer case 204 is not used. Rather, as shown, the input shaft 208 of the blower 202 includes a splined shaft while the output shaft 222 of the transfer case 208 includes a corresponding splined female coupler for direct coupling with the splined shaft. In other example embodiments, the male and female splined members are located on the other respective shaft. In other example embodiment, for example, a keyed coupling can be used between the input shaft 208 and the output shaft 222.

The blower housing 210 includes a pilot 230 and the transfer case housing 218 includes a corresponding female pilot 232, collectively forming a pilot coupling. The pilot coupling 230, 232 is for centering the transfer case 204 to the blower 202. Further, drilled and tapped bosses can be used for bolting the transfer case 204 to the blower housing 210, in example embodiments. In an example embodiment, the bosses circumferentially surround the pilot coupling. The blower housing 210 casing may also be strengthened to take the additional load of the transfer case 204 being bolted to it. In some example embodiments, the transfer case 204 can be configured with increased center to center distances when compared to standard transfer cases. The upper casting of this redesigned transfer case 204 would also have the female pilot 232 and a flanged face that would mate to a bolt pattern of the blower gear housing 210 allowing the two units to be bolted together. Other fasteners or connectors can be used as an alternative to or in combination with the bolts. In some example embodiments, there are no gaps or space between the transfer case housing 218 and the blower housing 230.

Referring again to FIGS. 2 and 3, this blower/transfer case combination may provide an increased benefit of simplified design and installation, for example, while maintaining the benefits of the blower 202 and transfer case 204 still being separate, self-contained, mechanisms that can be serviced and or replace independently of each other. The combination may also facilitate allowing for the blower 202 to be installed behind the transfer case 204 (as shown), as well as in front of it (in other example embodiments). The elimination of the intermediary driveshaft between the transfer case 204 and the blower 202 not only saves weight, cost and approximately 15 inches of overall length but also simplifies the installation and assembly. The transfer case housing 218 also has the increased center to center distance between the shafts 220, 222 allowing the use of the above-chassis frame bracket assembly 206 for ease of installation and driveline angle and height adjustments.

Reference is again made to FIGS. 4 to 7, which illustrate the vibration dampening feature in greater detail. The vibration dampeners 240 are bolted to the blower mounting feet 214 and are located between the bottom 212 of the blower housing 210 and the frame bracket assembly 206. In some example embodiments, the vibration dampeners 240 can be passive devices, formed of a strong resilient material which provides suitable dampening. Active control vibration dampeners, using e.g. sensors and force-feedback, can be used in other example embodiments.

As well, further aspects may be included within the blower mounting feet 214. For example, in some example embodiments, a different mount may be used that supports both the blower 202 and transfer case 204 equally with the "feet" extending from this mount that better balances the frame bracket assembly 206 and reduces the cantilevered load that the transfer case 204 would exert on the blower housing 210. This includes further configuring the frame bracket assembly 206, for example.

Referring again to FIGS. 4 and 5, in some example embodiments, the frame brackets 250, 252, 254 can take various shapes and configurations to accomplish the same thing, which is to facilitate mounting the blower/transfer case assembly to the truck chassis frame 118 while setting the angle of the blower and transfer case as well as the height above the truck chassis frame 118 so that the driveline calculations can be optimized for minimal torsional and inertial values. In some example embodiments, more or less brackets can be used, for example.

In the case of the transfer case/blower assembly shown in FIG. 8, the transfer case 204 can be built such that the upper portion, that bolts to the blower 202, will attach from either the front or rear face of the transfer case housing 218, allowing for installations where the blower 202 gets installed behind the transfer case 204 rather than the more typical location in front of the transfer case 204. This includes, for example, a symmetrical upper output casing of the transfer case housing 218 with removable, interchangeable covers, one with an opening and seal and the other simply blanked off.

Figure 9:
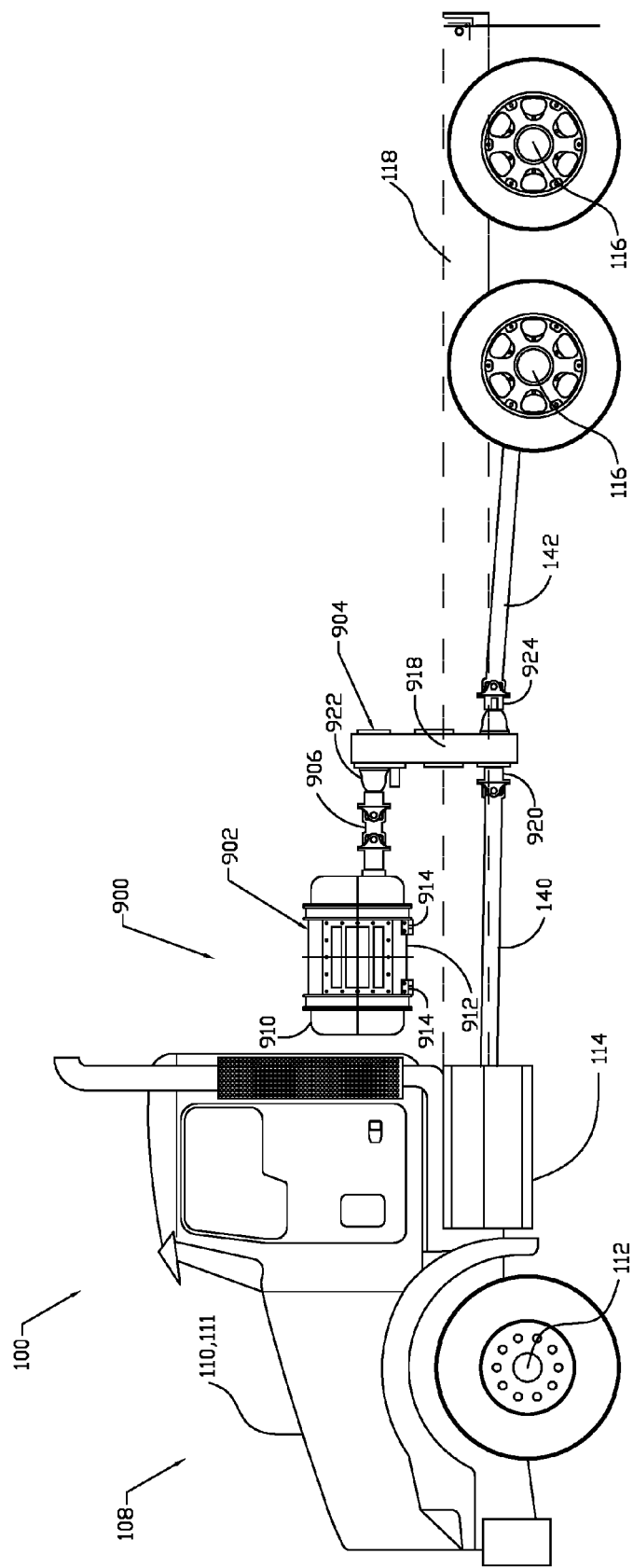
FIG. 9 illustrates a side view of another example embodiment of a blower drive system.
Figure 10:
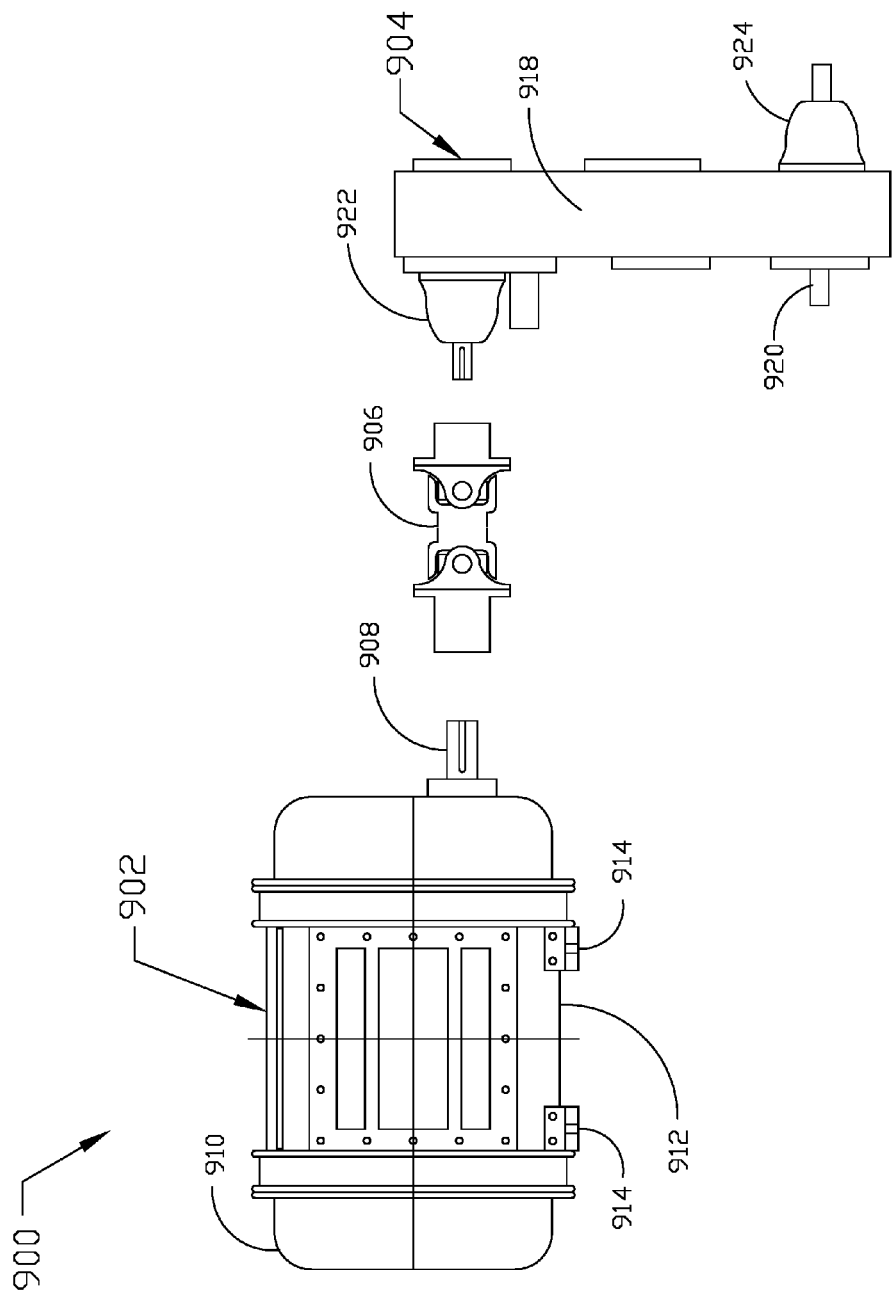
FIG. 10 illustrates an exploded side view of an assembly of the example blower drive system shown in FIG. 9.

Reference is now made to FIGS. 9 and 10, which illustrates another example embodiment of a blower drive system 900 for the vacuum truck 100. The same reference numbers for the vacuum truck 100 will be used for convenience of reference.

FIG. 9 illustrates a separate blower 902 and transfer case 904, which are joined by a short coupled drive shaft 906. The transfer case 904 can include a similar modified, purpose built transfer case, with an increased center to center distance, allowing the blower 902 to be installed above the chassis frame 118 with the blower 902 and transfer case 904 able to be mounted to the frame bracket assembly 206 (not shown), which was described above in relation to FIGS. 2 to 7. This still allows for driveline angle and height adjustments but would extend to accommodate separate mounts for the blower 902 and transfer case 904.

As shown in FIG. 10, in an example embodiment, the input shaft 908 on the blower 902 and the output shaft on the transfer case 904 are typically keyed shafts and the two are connected using the short coupled drive shaft 906.

For clarity, the frame bracket assembly 206 has not been shown in FIG. 9 to illustrate the location of the blower mounting feet 914 (bottom 912 of the blower housing 910) relative to the chassis frame 118, but can be similar to the frame bracket assembly 206 as described above. Also for clarity, the chassis frame 118 has been hidden (indicated by dotted lines), so that there can be seen the blower 902 and the transfer case 904 installation behind them.

Figure 12:
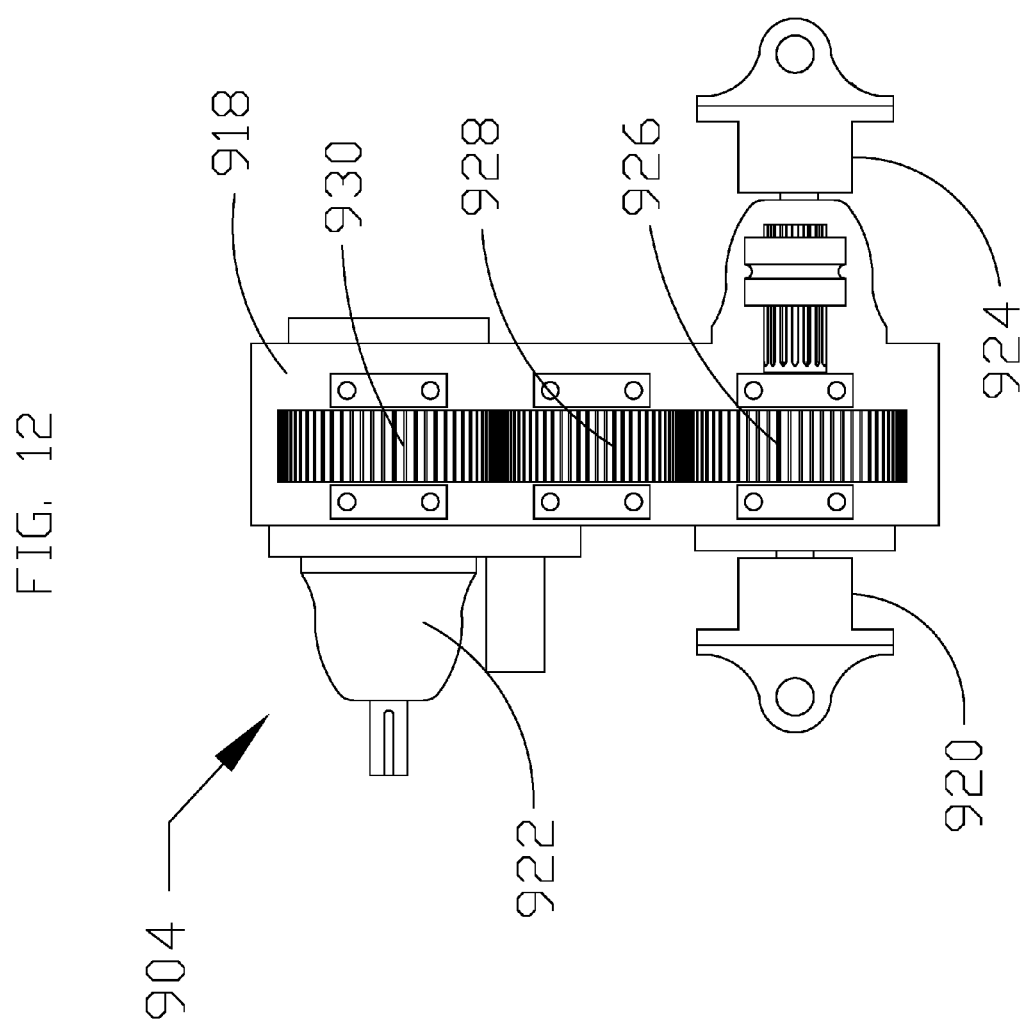
FIG. 12 illustrates a diagrammatic side view of an example transfer case which includes features that may be used in at least some example embodiments.

FIG. 12 illustrates a diagrammatic side view of the transfer case 904, which may be used in some example embodiments. Similar features and operation of the transfer case 904 to transfer drive can be used, in some example embodiments, for the other transfer cases described herein (e.g. 204, 1104).

Referring to FIGS. 9, 10 and 12, the transfer case 904 includes a transfer case housing 918, an input shaft 920 located on the front side of the transfer case housing 918, a front output shaft 922 driveable from the input shaft 920, and a rear output shaft 924 located on the rear side of the transfer case housing 918 and driveable from the input shaft 920. The first main driveline drive shaft 140 connects the input shaft 920 to the transmission 114, so that the input shaft 920 can receive drive directly or indirectly from the vehicle engine 111. The front output shaft 922 of the transfer case 904 is operably connected to drive the blower 902, through the short coupled drive shaft 906. As shown in FIG. 12, the input shaft 920 and rear output shaft 924 can have associated universal joint (u-joint) connectors, to account for slight variations in connection angle, for example up to approximately 3 degrees in angle. The gears 926, 928, 930 can be used to transfer the drive between the input shaft 920 and the output shafts 922, 924.

As shown in FIG. 9, the second main driveline drive shaft 142 is connectible to the rear output shaft 924 to one or more of the rear wheel axles 116. In some example embodiments, the transfer case 904 is able to selectively transfer drive to the output shafts 922, 924.

It can be appreciated that various forms of transfer cases can be used in example embodiments. The gears 926, 928, 930 can have the same or different sizes to provide the desired gear ratios. While gears are described in some example embodiments, in other example embodiments other mechanism may also be used instead of or in combination with gears. For example, belts, chains, hydraulics, pneumatics, etc. may be used. In some example embodiments, oil pump(s) may also be included to provide suitable lubrication (not shown).

As well, in some example embodiments, a shifter or gear shifter system (not shown) can be used to select between output shafts 922, 924. In some example embodiments, the transmission 114 is relied upon to provide low drive to the blower 902. In other example embodiments, a shifter may be included in the transfer case 904 to shift to a low gear drive output (using suitable gear ratios). In some example embodiments, the transfer mechanism increases revolutions per minute (rpm) from the input shaft 920 to at least one of the front output shaft 922 or the rear output shaft 924, for example using suitable gear ratios.

Figure 11:
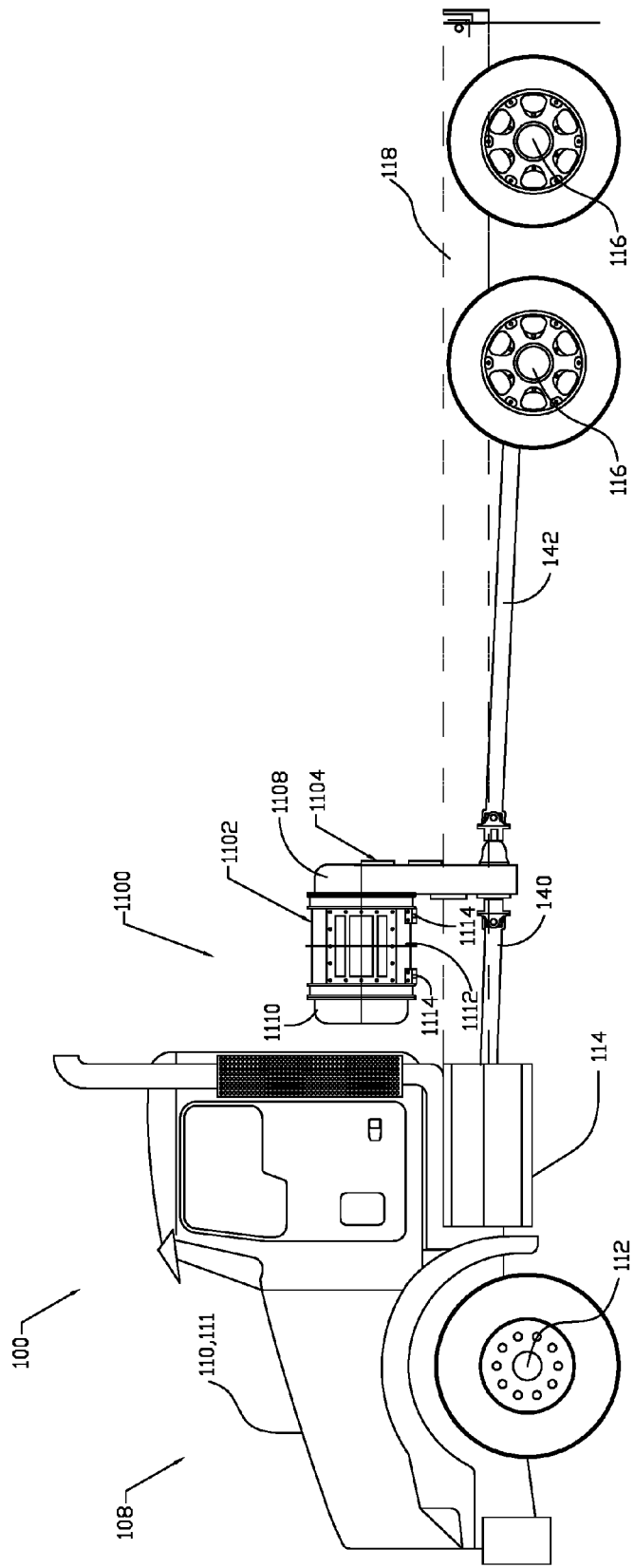
FIG. 11 illustrates a side view of yet another example embodiment of a blower drive system.

FIG. 11 illustrates another example embodiment of a blower drive system 1100. The same reference numbers for the vacuum truck 100 will be used for convenience of reference. As shown in FIG. 11, in an example embodiment, the transfer case 1104 is integrated into the blower housing 1110 itself and becomes part of the drive end of the blower 1102. As shown, the transfer case 1104 includes a housing 1108 which is unitary with the blower housing 1110 for a unitary casing. This example embodiment produces the most compact design, saving approximately an additional 10 inches to 12 inches over the already more compact design in FIG. 2.

The blower 1102 is installed above the chassis frame 118 with the blower 1102 and transfer case 1104 able to be mounted to the frame bracket assembly 206 (not shown), which was described above in relation to FIGS. 2 to 7. This allows for driveline angle and height adjustments.

For clarity, the frame bracket assembly 206 has not been shown in FIG. 11 to illustrate the location of the blower mounting feet 1114 (bottom 1112 of the blower housing 1110) relative to the chassis frame 118, but can be similar to the frame bracket assembly 206 as described above. Also for clarity, chassis frame 118 has been hidden (indicated by dotted lines), so that there can be seen the blower 1102 and the transfer case 1104 installation behind them.

In some example embodiments, standard off-the-shelf transfer cases can be used as readily available from numerous manufacturers to achieve some the described systems. In other example embodiments, modifications may be made to existing transfer case designs, and/or are purpose-built for the described systems. In some example embodiments, standard blowers can be used as readily available from numerous manufacturers. In other example embodiments, modifications may be made to existing blower designs. As well, in some example embodiments, a standard truck with chassis may also be used as a starting point to manufacture the vacuum trucks as described herein.

The installation process of the described blower drive systems, in accordance with example embodiments, may produce benefits for the blower manufacturer, the original equipment manufacturer (OEM or installer) and/or the end user or customer. The blower manufacturer can now offer to the OEM's a comprehensive pre-built package that can include the blower, transfer case, silencers, manifold (if required), final filter, check valve, cyclones and optional blower sound enclosure, etc. This is all made possible by the fact that the entire installation can now be placed above the frame where there are no obstructions from the truck chassis to deal with and every installation can be standardized and fit virtually any truck. This could also increase dollar sales volume and profits for the blower manufacturers by allowing them to package and sell a greater part of the installation process, rather than sell just the blower.

The OEM could benefit by having a pre-built package that can simply be purchased and installed onto the chassis with a greatly reduced and simplified installation process reducing the overall time the truck spends in the shop being assembled, thereby allowing for greater throughput and increased productivity for the shop resulting in greater sales volume and corresponding profits without increasing the size of the shop or available manpower. Standardizing the installation could allow OEM's to order truck chassis' with the cross members installed so as not to interfere with the placement and installation of the new blower/transfer case design further simplifying the installation. Mass producing a standardized blower/transfer case package for multiple OEM's could also improve the quality of the installation as well as reduce the cost.

The end user could benefit when it comes time to re-chassis the vacuum truck. In this industry, the vacuum tank and vacuum system typically out lasts the original chassis. Smaller vacuum trucks, with simple hydraulic drive vacuum pumps, that are PTO driven are very modular and make removing and reinstalling them onto another new chassis quite simple. Until now, larger transfer case drive vacuum trucks were very difficult to re-chassis as the blower and transfer case were literally installed into the chassis and removing the blower and transfer case mounts would destroy them and typically the new chassis would be sufficiently different it would require starting from scratch. With this installation package the entire blower and transfer case module could be removed as a unit and the reinstallation of it would be greatly simplified with easy adjustments for driveline angle and height, to suit the new chassis, being made possible by the specially designed above-frame mounting assembly shown in the accompanying drawings.

There could also be a potential cost and weight savings regarding the transfer case itself. The transfer cases being utilized currently are typically slightly modified versions of the units used to power the front axles of 4, 6 and 8 wheel drive vehicles. These transfer cases have to be able to handle the full horsepower and torque of the truck chassis engine and transmission, as they would be powering part of the driveline of the truck and would be exposed to all of the inherent shock loading and inertia that goes along with it. The transfer cases for the blower drive systems described herein, due to their extreme center to center distances, could be purpose built for this particular application and could therefore be designed much lighter to handle the anticipated loads of the blower with much less inertia and torque requirements than a fully loaded truck's driveline.

In some example embodiments, the blower drive systems and/or the vacuum trucks 100 shown in the Figures are shown to scale. In other example embodiments, variations to the scale and/or mounting angle are not shown in the Figures, but would be well understood to those skilled in the art. While some of the blower drive systems are shown in some of the Figures as being mounted as level with respect to ground, the blower drive systems with all of the components mounted on a slight angle, as described in detail herein.

The various embodiments presented are merely examples and are in no way meant to limit the scope of this disclosure. Reference to connections includes direct connections as well as indirect connections to perform the stated functions. Variations of the example embodiments described herein will be apparent to persons of ordinary skill in the art, such variations being within the intended scope of the present disclosure. In particular, features from one or more of the described embodiments may be selected to create alternative embodiments comprised of a sub-combination of features which may not be explicitly described. In addition, features from one or more of the described embodiments may be selected and combined to create alternative embodiments comprised of a combination of features which may not be explicitly described. Features suitable for such combinations and sub-combinations would be readily apparent to persons skilled in the art upon review of the present disclosure as a whole. The subject matter described herein intends to cover and embrace all suitable changes in technology.

The invention claimed is:

1. A blower drive system for a vehicle, the vehicle including a vehicle engine, one or more rear wheel axles, and a vehicle chassis frame for mounting the one or more rear wheel axles and which defines a support bed for the vehicle, the blower drive system comprising:
    a blower including a blower input shaft and a blower housing having a bottom;

a transfer case including a transfer case housing, an input shaft, a first output shaft driveable from the input shaft, and a second output shaft driveable from the input shaft;

the input shaft operably connected to receive drive from the vehicle engine;

the second output shaft operably connectable to drive the one or more rear wheel axles;

the first output shaft operably connected to drive the blower input shaft; and a frame bracket assembly including one or more connections to the vehicle chassis frame and one or more connections to the blower housing, wherein the frame bracket assembly mounts the blower housing in a specified fixed angle with respect to ground and mounts the bottom of the blower housing in a specified fixed height above the vehicle chassis frame.

2. The blower drive system as claimed in claim 1, wherein the transfer case housing is directly connected to the blower housing.

3. The blower drive system as claimed in claim 2, wherein there are no gaps between the transfer case housing and the blower housing.

4. The blower drive system as claimed in claim 1, wherein the transfer case housing is unitary with the blower housing.

5. The blower drive system as claimed in claim 1, wherein the frame bracket assembly includes at least one set of brackets wherein for one set of brackets each bracket defines fastening positions which align with the other bracket to result in a plurality of specified heights for the bottom of the blower housing including the specified fixed height.

6. The blower drive system as claimed in claim 5, wherein the fastening positions include throughholes defined by each the brackets.

7. The blower drive system as claimed in claim 5, wherein for one set of brackets each bracket defines fastening positions which align with the other bracket to result in a plurality of specified angles for the blower housing including the specified fixed angle.

8. The blower drive system as claimed in claim 7, wherein the plurality of specified angles includes a range from horizontal to about three degrees downward towards a rear end of the vehicle.

9. The blower drive system as claimed in claim 1, further comprising one or more vibration dampeners located between the bottom of the blower and the frame bracket assembly.

10. The blower drive system as claimed in claim 1, wherein the first output shaft is directly coupled to the blower input shaft without the use of an intermediary drive shaft.

11. The blower drive system as claimed in claim 1, wherein the first output shaft or the blower input shaft includes a splined shaft, and the other of the first output shaft or the blower input shaft includes a corresponding splined female coupler for direct coupling between the first output shaft and the blower input shaft.

12. The blower drive system as claimed in claim 1, wherein the specified fixed angle is a non-horizontal angle.

13. The blower drive system as claimed in claim 1, wherein the input shaft is located on a front side of the transfer case, the first output shaft is located on the front side of the transfer case, and the second output shaft is located on a rear side of the transfer case opposite the front side of the transfer case.

14. The blower drive system as claimed in claim 1, wherein the specified fixed height and the specified fixed angle are fixed during operation of the blower input shaft.

15. The blower drive system as claimed in claim 1, wherein a center-to-center distance between the input shaft and the first output shaft is at least 24 inches.

16. The blower drive system as claimed in claim 1, wherein the center-to-center distance between the input shaft and the first output shaft is on or about 28 inches.

17. A blower drive system for a vehicle, the vehicle including a vehicle engine, one or more rear wheel axles, and a vehicle chassis frame for mounting the one or more rear wheel axles and which defines a support bed for the vehicle, the blower drive system comprising:

a blower including a blower input shaft and a blower housing having a bottom; and a frame bracket assembly for connecting the blower housing to the vehicle chassis frame, the frame bracket assembly including a first set of brackets and a second set of brackets, wherein each bracket of the first set of brackets defines throughholes which align together to result in a plurality of specified heights for the bottom of the blower housing above the vehicle chassis frame, including a specified fixed height for the bottom of the blower housing above the vehicle chassis frame, wherein each bracket of the second set of brackets defines throughholes which align together to result in a plurality of specified angles for the blower housing, including a specified fixed angle for the blower housing with respect to ground.

18. The blower drive system as claimed in claim 17, wherein the plurality of specified angles includes a range from horizontal to about three degrees downward towards a rear end of the vehicle.

19. The blower drive system as claimed in claim 17, wherein the specified fixed angle is a non-horizontal angle.

20. The blower drive system as claimed in claim 17, wherein the specified fixed height and the specified fixed angle are fixed during operation of the blower input shaft.

21. The blower drive system as claimed in claim 17, wherein at least one bracket is a bracket for both the first set of brackets and the second set of brackets.

22. The blower drive system as claimed in claim 17, further comprising a transfer case connected to selectively transfer drive from the vehicle engine to the blower input shaft or to the one or more rear wheel axles.

23. Use of the blower drive system as claimed in claim 1 for transferring drive from the vehicle engine to the blower.

24. Use of the blower drive system as claimed in claim 17 for transferring drive from the vehicle engine to the blower.

* * * * *